United States Patent
Shaske et al.

(10) Patent No.: US 12,369,662 B2
(45) Date of Patent: Jul. 29, 2025

(54) PROTECTIVE GARMENTS

(71) Applicant: Milwaukee Electric Tool Corporation, Brookfield, WI (US)

(72) Inventors: Ben Shaske, Brookfield, WI (US); Beth Cholst, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 48 days.

(21) Appl. No.: 18/322,990

(22) Filed: May 24, 2023

(65) Prior Publication Data

US 2024/0099407 A1 Mar. 28, 2024

Related U.S. Application Data

(60) Provisional application No. 63/346,735, filed on May 27, 2022.

(51) Int. Cl.
*A41D 31/24* (2019.01)
*A41D 13/05* (2006.01)

(52) U.S. Cl.
CPC ....... *A41D 31/245* (2019.02); *A41D 13/0543* (2013.01); *A41D 2600/20* (2013.01)

(58) Field of Classification Search
CPC .............. A41D 31/245; A41D 13/0543; A41D 2600/20; A41D 1/002; A41D 13/043; A41D 31/24; A41D 19/01505; A41D 19/01511; A41D 13/05; A41D 13/0518; A41D 13/0525; A41D 13/06; A41D 13/08; A41D 13/081; A41D 13/084; B23D 59/001; B23D 59/002; B23D 59/005; B25F 5/00;
(Continued)

(56) References Cited

U.S. PATENT DOCUMENTS 4,280,342 A * 7/1981 Eng ................. A41D 31/245
66/196
4,351,065 A * 9/1982 Bouchard .............. A41D 13/05
2/23
(Continued)

FOREIGN PATENT DOCUMENTS

AT 519559 B1 * 8/2018 ........... A01G 3/0335
DE 102006014819 A1 * 10/2007 ........... B27G 19/003
(Continued)

OTHER PUBLICATIONS

English translation AT 519559 B1 (Doc pub Aug. 15, 2018) (Year: 2018).*
(Continued)

*Primary Examiner* — Amy Vanatta
(74) *Attorney, Agent, or Firm* — Dority & Manning, P.A.

(57) ABSTRACT

Protective garments are provided. A protective garment includes a protective garment fabric. The fabric is formed from a plurality of layers. At least one layer of the plurality of layers is formed from a plurality of fibers adapted to entangle with a moving blade of a tool upon contact between the moving blade and the fabric. At least one layer of the fabric includes metal fibers. The garment includes a garment sensing device including a sensor configured to detect when one or more metal fibers are cut, and a signal generator configured to send a signal to the tool to disable movement of the moving blade.

14 Claims, 3 Drawing Sheets

(58) Field of Classification Search
CPC .. B26D 7/24; B27G 19/003; F16P 3/12; F16P 3/147
USPC .............................................................. 2/2.5
See application file for complete search history.

(56) References Cited

U.S. PATENT DOCUMENTS

| | | | | |
|---|---|---|---|---|
| 7,276,458 | B2 * | 10/2007 | Wen ..................... | D03D 1/0052 2/2.5 |
| 2003/0193400 | A1 * | 10/2003 | Grasselli ................ | F16P 3/12 340/650 |
| 2005/0059307 | A1 * | 3/2005 | Moeseke ............. | B60R 25/1004 442/52 |
| 2008/0092599 | A1 * | 4/2008 | Hazan .................. | A41D 31/245 174/124 R |
| 2008/0302626 | A1 | 12/2008 | Rossi et al. | |
| 2013/0152752 | A1 * | 6/2013 | Cappellari .............. | F16P 3/148 83/58 |
| 2018/0211345 | A1 * | 7/2018 | Bean ....................... | G01S 11/06 |
| 2019/0301675 | A1 * | 10/2019 | Rickey .................... | H04B 5/79 |
| 2022/0212275 | A1 * | 7/2022 | Sundberg .............. | B23D 63/162 |

FOREIGN PATENT DOCUMENTS

| | | | | |
|---|---|---|---|---|
| EP | 0362937 | A2 | 4/1990 | |
| FR | 2712837 | A1 * | 6/1995 | ............... A01G 3/02 |
| FR | 2963081 | A1 | 1/2012 | |
| GB | 2587774 | A * | 6/2021 | ......... B23Q 11/0092 |
| IT | 201800009931 | A1 * | 4/2020 | |
| SE | 543699 | C2 * | 6/2021 | ............. A01G 3/053 |
| WO | WO-9637350 | A1 * | 11/1996 | ........... B27G 19/003 |

OTHER PUBLICATIONS

European Search Report Corresponding to U.S. Appl. No. 23/175,259 on Jan. 2, 2024.

* cited by examiner

PROTECTIVE GARMENTS

CROSS-REFERENCE TO RELATED APPLICATIONS

The present application claims priority to U.S. Provisional Patent Application No. 63/346,735 filed on May 27, 2022, the disclosure of which is incorporated by reference herein in its entirety.

FIELD

The present disclosure relates generally to protective garments to be worn by a user to protect the user from operation of power tools, e.g., chainsaws and the like.

BACKGROUND

Protective garments, e.g., chaps of a pant-like construction to cover the legs of a wearer, are often used for protection from the hazards of operation of power tools. For instance, protective chaps are commonly used to provide protection from the moving chain of a chainsaw. When the chainsaw slips and contacts the protective chaps, the moving chain cuts the chaps, thereby loosening the fibers of the chaps, which can clog the chain. In a gas chainsaw, when the chain gets clogged, the chainsaw slows down and loses its torque and causes the motor to stall, thereby protecting the operator of the chainsaw by eliminating or mitigating damage done by the chain. However, in an electric power tool such as a chainsaw, when the tool slows down, the tool gets more torque and may not prevent the moving chain from cutting through all the layers of the protective garment, thereby causing a hazard to the operator.

Accordingly, improved protective garments are desired in the art. In particular, protective garments which provide protection against the hazards of electric power tools that increase in torque when the tool slows down would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a protective garment is provided. The protective garment includes a protective garment fabric. The fabric is formed from a plurality of layers. The at least one layer of the plurality of layers is formed from a plurality of fibers adapted to entangle with the moving blade upon contact between the moving blade and the fabric. At least one layer of the fabric comprises metal fibers. The garment includes a garment sensing device having a sensor configured to detect when one or more metal fibers are cut and a signal generator configured to send a signal to the tool to disable movement of the moving blade.

In accordance with another embodiment, a protective garment for protection from a tool having a moving blade is provided. The protective garment includes a protective garment fabric. The fabric is formed from at least ten layers. At least one layer of the fabric is formed from a plurality of fibers adapted to entangle with the moving blade upon contact between the moving blade and the fabric.

In accordance with another embodiment, a protective garment and tool system is provided. The system includes a protective garment and a tool having a moving blade. The protective garment includes a protective garment fabric. The fabric is formed from a plurality of layers. At least one layer of the plurality of layers is formed from a plurality of fibers adapted to entangle with the moving blade upon contact between the moving blade and the fabric. At least one layer of the plurality of layers comprises metal fibers. The garment includes a garment sensing device coupled to the garment and having a sensor configured to detect when one or more metal fibers are cut and a signal generator configured to send a signal to the tool to disable movement of the moving blade. The tool having a moving blade includes a signal receiver configured to receive the signal from the signal generator of the protective garment, and a controller configured to disable the moving blade when the signal is received.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
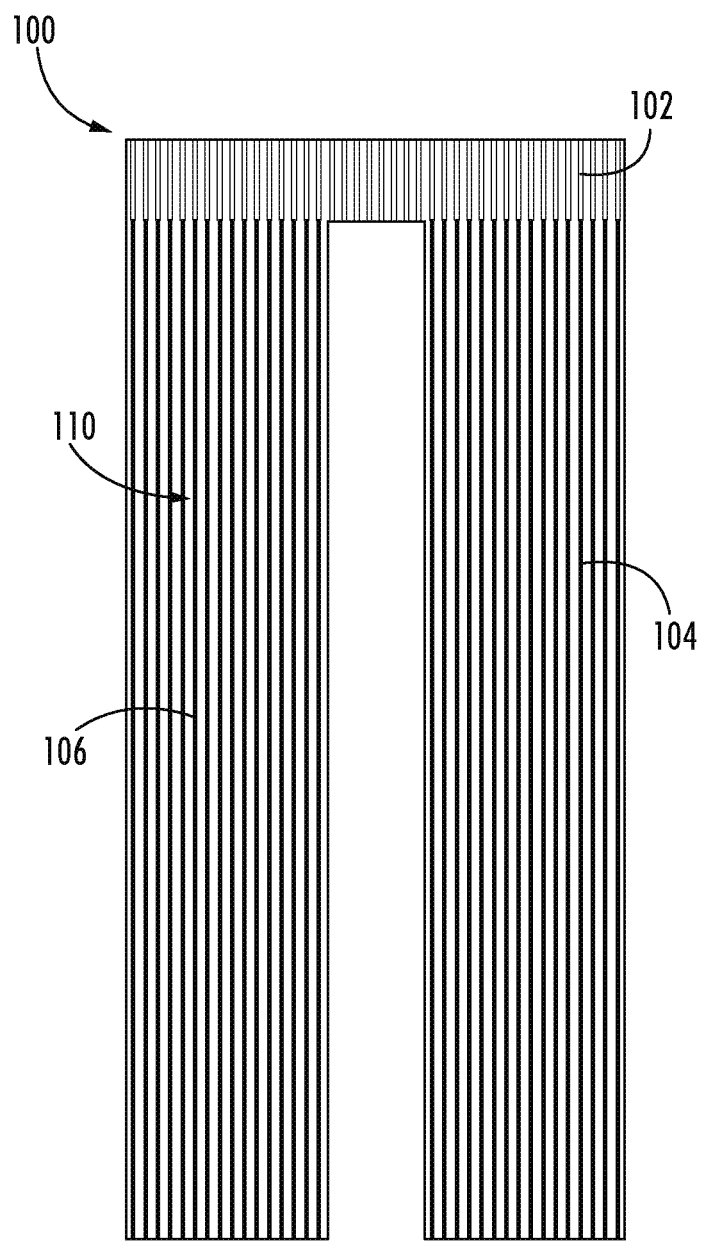
FIG. 1 is a front view of a protective garment in the form of chaps in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is fake (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, the present disclosure is directed to improved protective garments, e.g., protective chaps. Protective garments in accordance with the present disclosure allow for improved protection for an operator from the hazards of electric power tools or other sharp tools, such as chainsaws, pole saws, or even manually operated saws. Further, protective garment systems in accordance with the present disclosure provide tools with improved safety features, e.g., shut off features.

A protective garment of the present disclosure may be formed from or include a material that is configured to stop the chain of a chainsaw to eliminate or mitigate damage done by the chain. In particular, the protective garment may be formed from a fabric. The fabric may be formed from strong yarns which are relatively easily ripped from the fabric and drawn into the chain drive of a chainsaw. When the yarns are drawn into the chain drive of the chainsaw, movement of the chain may be inhibited, thereby protective the wearer from the moving chainsaw chain. The fabric may be, thus, sacrificed to provide protection from the moving chainsaw chain.

For instance, the protective garment fabric can be formed from multiple layers. For instance, the fabric can include an outermost layer configured to face the environment, an innermost layer configured to face the wearer's body, and one or more intermediate layers disposed between the innermost layer and the outermost layer. Each of the layers can be separate or they can be coupled together in any suitable manner.

One or more of the layers of the fabric can be formed from long fibers of high strength material such as para-aramid (e.g. Kevlar®), ballistic nylon, high performance filament yarn made of PET (polyethylene terephthalate), PP (polypropylene) or PE (polyethylene), PA (polyamide) (for example materials such as Dyneema® or Vectran® etc). Additionally or alternatively, one or more of the protective garment fabric layers can be formed from heavy duty nylon, polyester, or other suitable materials. For instance, at least the outermost layer of the fabric configured to face the environment may be formed of fibers of high strength material as disclosed.

To enhance the protectiveness of the protective garment fabric, the fabric can be formed from ten or more layers. One or more of the layers can be formed from high strength fibers as described above. For instance, the outermost layer and one or more of the intermediate layers may be formed from high strength fibers as described above. In some aspects of the present disclosure, all layers of the protective garment fabric may be formed from high strength fibers as described.

The fabric can be provided with one or more coatings. For instance, if desired, a polyurethane coating can be provided for water protection.

In some aspects of the present disclosure, the protective garment fabric can include a diamond coated or impregnated layer. For instance, diamond dust can be contained within a coating applied to the fabric or otherwise integrated into the protective garment fabric. The diamond particles can enhance the protectiveness of the protective garment by dulling the blade of a tool, e.g., chainsaw, when the blade comes into contact with the protective garment fabric. As a result, the dulled blade may not be able to continue cutting through the protective garment fabric.

In further aspects of the present disclosure, the present garment fabric can include metal, e.g., metal fibers, incorporated into the fabric. For instance, metal fibers may be incorporated, e.g., woven, into one or more layers of the fabric. In one aspect of the present disclosure, metal fibers may be woven into the outermost layer of the fabric such that metal fibers may be present within the first surface that a tool, e.g., chainsaw, may come in contact with when a user is wearing the protective garment.

The metal fibers can be coupled to a garment sensing device. The garment sensing device can be configured to sense when one or more metal fibers in the fabric are cut, e.g., partially cut or fully severed. The garment sensing device further includes at least one signal generator configured to generate a signal indicating that one or more of the metal fibers have been cut.

In a protective garment and tool system, a tool can include a corresponding receiver configured to be coupled with the garment sensing device. When a metal fiber is cut in the fabric, the garment sensing device can communicate a signal via the signal generator to the receiver to shut off the tool, e.g., by terminating power to the tool. The garment sensing device signal generator can be coupled to the tool receiver by a wired or a wireless connection.

For instance, in one aspect of the present invention, the garment sensing device and the tool receiver can each include a wireless communication module, e.g., compatible for Bluetooth communication, WiFi communication, or any other suitable wireless form of communication. The garment sensing device can include its own power source, e.g., a battery or other suitable source of electrical power. When a metal fiber is cut in the fabric, the garment sensing device can wirelessly generate a signal that is transmitted to the receiver to instruct the controller of the tool to shut off the tool.

In another aspect of the present invention, the garment sensing device and the tool receiver can be coupled by a wired electrical connection. The wired electrical connection may be in the form of a tether between the protective garment and the tool. When a metal fiber is cut in the fabric, the garment sensing device can send a wired signal through the tether to the receiver of the tool to instruct the controller of the tool to shut off the tool. Additionally, if the tether becomes uncoupled from the tool, the tool can be automatically powered off. In this arrangement, the protective garment sensing device may include its own power source, e.g., a battery, or the garment sensing device could be provided with electricity from the tool via the tether.

In a further aspect of the present invention, in a protective garment tool system, both the tool and the protective garment can be provided with a tilt sensor. The tilt sensors may sense the angle changing of the position of the tool relative to the protective garment. For example, a tilt sensor may be provided at or near a tip of a bar of a chainsaw. The tilt sensors can communicate with a controller of the tool to send signals of the relative position of the tool, e.g., the bar of a chainsaw, relative to the protective garment. The tilt sensors may sense as the angle of the tool changes relative to the protective garment and/or when the tool touches the protective garment. The controller of the tool can be configured to turn off the tool based on the signal(s) sent from the tilt sensors.

The protective garment of the present disclosure, particularly including one or more garment sensing devices, may be particularly useful in enhancing protection of an electric chainsaw user. As described previously, in an electric powered chainsaw, slowing of the moving chain causes the tool to increase the torque delivered to the moving chain. Thus, providing one or more garment sensing devices in communication with the chainsaw may improve the effectiveness of stopping the chainsaw when the chainsaw comes into contact with the protective garment by sending a signal to the chainsaw controller to stop delivering power to the moving chain.

The protective garment of the present disclosure can be in the form of any desired garment. For instance, as illustrated in FIGS. 1-4, the protective garment can be in the form of chaps, i.e., leg coverings configured to be worn over one or both legs of a user. The chaps can be configured to cover the front of a user's leg(s), the back of a user's leg(s), and/or around as much of the user's leg(s) as desired. The protective garment of the present disclosure may further be in the form of a protective upper body garment, e.g., one or more sleeve(s) of full or partial length and/or a full shirt having sleeve(s) of any desired length. Additionally or alternatively, the protective garment can be in the form of a neck protector, apron, belt, ankle guard, or any other desired garment.

Referring now to the drawings, FIG. 1 illustrates an exemplary protective garment in the form of a pair of chaps 100. The chaps 100 have a waist section 102, a first leg 104 and a second leg 106. The chaps 100 are formed from a protective garment fabric 110 having a plurality of layers including one or more layers formed from high strength fibers as described above.

Figure 2:
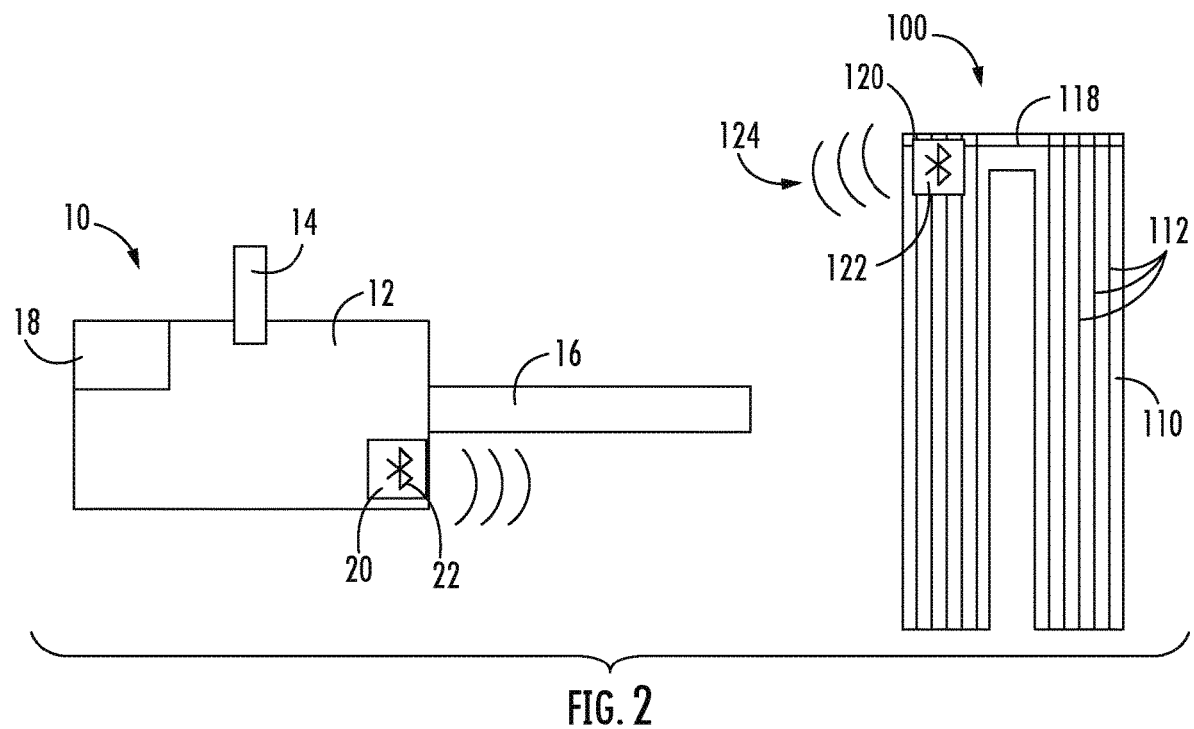
FIG. 2 is a front view of a protective garment and tool system having a wireless connection in accordance with embodiments of the present disclosure.

FIG. 2 illustrates a protective garment and tool system including chaps 100 and a chainsaw 10. The chaps 100 are formed from a protective garment fabric 110. The protective garment fabric 110 includes metal fibers 112 incorporated into at least one layer of the fabric. A garment sensing device 120 is coupled to the chaps 100. The garment sensing device 120 is coupled, e.g., via a sensor 118, to the metal fibers 112. The sensor 118 may sense when one or more of the metal fibers are cut. For example, the sensor 118 can detect, by a change in an electrical signal from a metal fiber, if a metal fiber has been cut.

The garment sensing device 120 can include a signal generator 122. The signal generator 122 can send a signal 124 when the sensor 118 senses that one or more of the metal fibers 112 are cut. For example, the signal generator 122 can send a signal 124 to the tool 10. The signal 124 can instruct the tool 10 to turn off.

The chainsaw 10 illustrated in FIG. 2 as part of a protective garment and tool system includes a main housing 12, a handle 14, a chainsaw bar 16 to which a saw chain may be coupled, and a battery 18. The main housing 12 houses an actuator (not shown), e.g., a motor, configured to drive movement of the saw chain about the bar 16. The chainsaw 10 can include a signal receiver 20 that is configured to receive a signal 124 that is generated by the signal generator 122 of the garment sensing device 120. The signal receiver 20 can be coupled to a controller, e.g., a PCB or other suitable control means, of the chainsaw 10 to instruct the chainsaw 10 to cease providing power to a motor of the chainsaw 10 when the signal 124 is received.

In one example, as illustrated in FIG. 2, the garment sensing device 120 and the signal receiver 20 of the chainsaw 10 can be wirelessly coupled. For example, the signal generator 122 can include a Bluetooth or other wireless communication module, and the signal receiver 22 can include a corresponding Bluetooth or other wireless communication module such that the signal generator 122 can communicate the signal 124 to the signal receiver 22.

Figure 3:
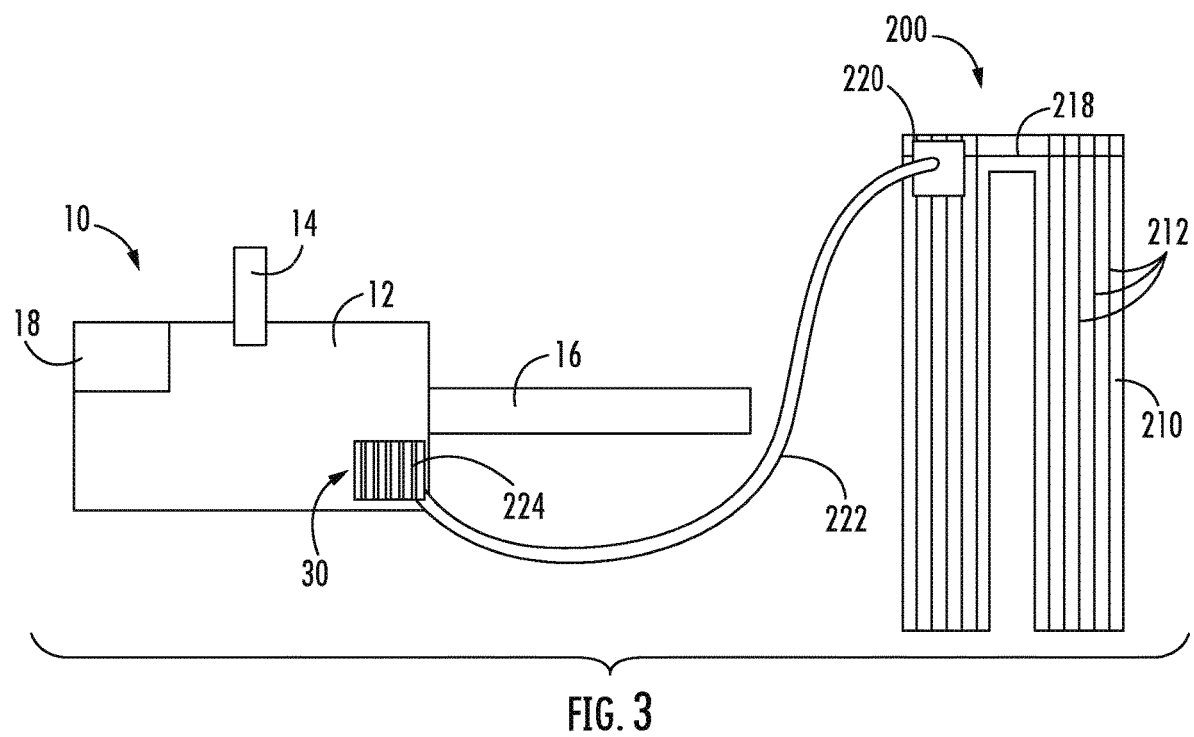
FIG. 3 is a front view of a protective garment and tool system having a wired connection in accordance with embodiments of the present disclosure.

FIG. 3 illustrates a protective garment and tool system analogous to that shown in FIG. 2, but in which the chaps 200 and the tool 10 are provided with a wired coupling via a tether 222. For instance, the chaps 200 shown in FIG. 3 include metal fibers 212 incorporated into the fabric 210, a sensor 218 configured to sense when one or more fibers 212 are cut, and a garment sensing device 220 coupled to the sensor 218. A tether 222 is provided from the garment sensing device 220 and extends along a length terminating at a signal generating coupling 224 configured to be received by the chainsaw 10. For instance, the chainsaw 10 can include a tether receiving port 30 into which the signal generating coupling 224 can be coupled, inserted, or plugged. As described above, when the sensor 218 detects that a metal fiber 212 has been cut, a signal can be transmitted via the tether 222 and the signal generating coupling 224 to the chainsaw 10. Additionally or alternatively, the chainsaw 10 can be provided with a safety feature which requires the signal generating coupling 224 to be coupled to the receiving port 30 in order for power to be provided to the motor of the chainsaw 10. Thus, if the signal generating coupling 224 becomes detached from the port 30, the chainsaw 10 may automatically terminate any power to the motor.

Figure 4:
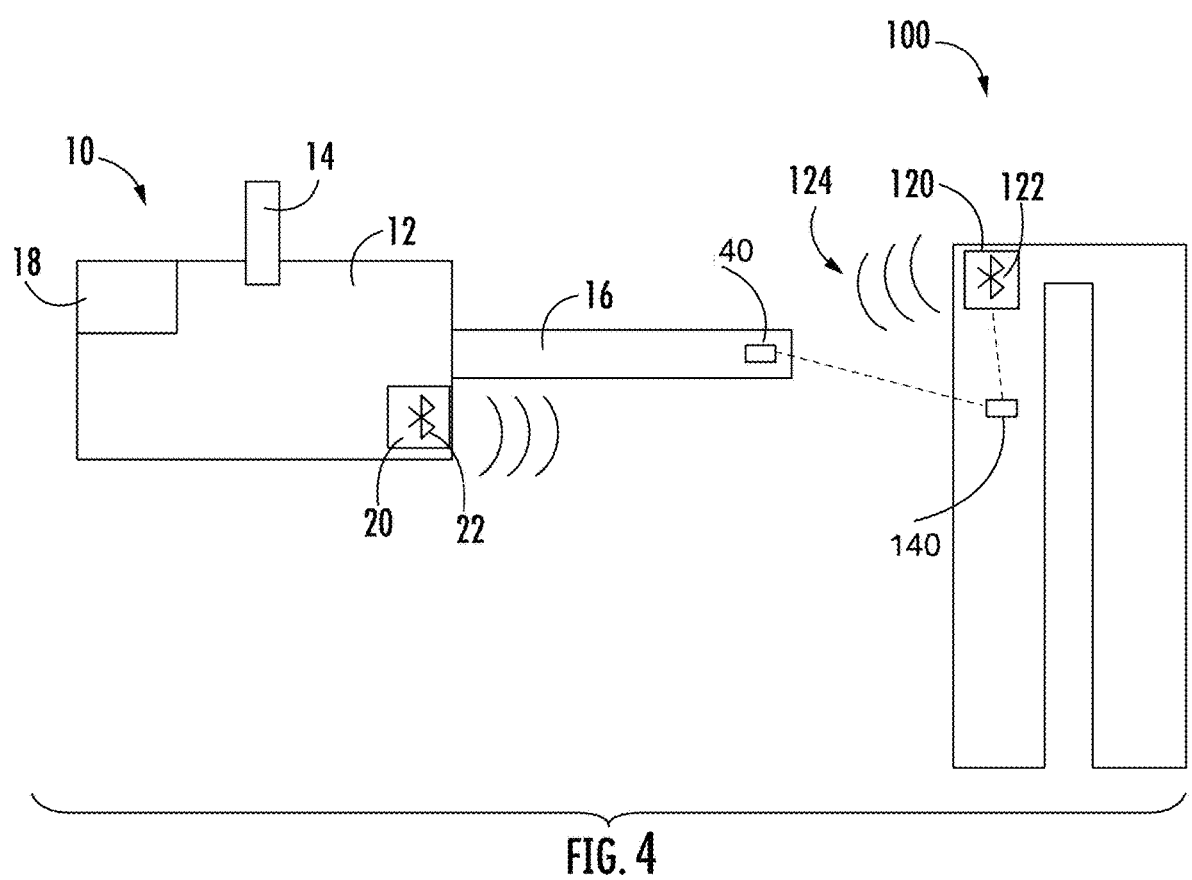
FIG. 4 is a front view of another protective garment and tool system in accordance with embodiments of the present disclosure.

FIG. 4 illustrates a further aspect of the protective garment and tool system analogous to that shown in FIG. 2 and further provided with tilt sensors 40 and 140 configured to detect the relative position of the chaps 100 and the chainsaw 10. For instance, the chaps 100 can be provided with a tilt sensor 140 and the chainsaw 10 can be provided with a tilt sensor 40. The tilt sensor 140 can be positioned at any suitable location on the chaps 100. For instance, the tilt sensor 140 may be positioned at the waist section 102 of the chaps 100. The tilt sensor 40 may be desirably positioned at a location along the bar 16 of the chainsaw 10, e.g., at a far end of the bar 16 away from the housing 12, such that the tilt sensor 40 of the chainsaw 10 can particularly indicate a relative location of the saw chain. The tilt sensor 140 can be coupled to the garment sensing device 120, e.g., by a wired or wireless connection.

In this manner, the tilt sensor 140 of the chaps 100 can sense the relative position of the corresponding tilt sensor 40 of the chainsaw 10 to detect the relative position of the chainsaw bar 16 and the chaps 100. If the tilt sensor 140 determines that the chainsaw bar 16 is in a hazardous location relative to the chaps 100 and/or that the relative angle between the tilt sensor 40 of the chainsaw bar 16 is changing rapidly in the direction of the chaps 100, the garment sensing device 120 can send a signal via the signal generator 122 to instruct the chainsaw 10 to turn off.

For instance, the signal generator 122 may send a tilt signal to the controller if the relative angle between the chainsaw bar 16 and the chaps 100, i.e., the tilt sensor 40 and the tilt sensor 140, is outside a predetermined range. Additionally or alternatively, the signal generator 122 may send a tilt signal to the controller if the relative angle between the chainsaw bar 16 and the chaps 100, i.e., the tilt sensor 40 and the tilt sensor 140, is changing at a rate faster than a predetermined threshold. The tilt signal may instruct the controller to cease providing power to a motor of the chainsaw, thereby stopping movement of the chain.

A method of protecting a user of a tool having a movable blade, e.g., by inhibiting movement of the movable blade, is provided. The method may include a first step of providing a user with a protective garment, such as protective chaps. The user dons the protective garment prior to use of the tool. The method may include a further step of actuating the tool such that a blade of the tool is engaged, e.g., moving, such as a chain of a chain saw. The method may include a further step of inhibiting movement of the blade of the tool when the blade contacts the protective garment, e.g., by cutting one or more metal fibers in the protective garment that are coupled to a signal generator that sends a signal to a controller of the tool to disable movement of the blade.

Further aspects of the invention are provided by one or more of the following embodiments:

A protective garment for protection from a tool having a moving blade includes a protective garment fabric. The fabric is formed from a plurality of layers. At least one layer of the plurality of layers is formed from a plurality of fibers adapted to entangle with the moving blade upon contact between the moving blade and the fabric. At least one layer of the plurality of layers comprises metal fibers. The garment includes a garment sensing device having a sensor configured to detect when one or more metal fibers are cut and a signal generator configured to send a signal to the tool to disable movement of the moving blade.

The protective garment of any one or more of the embodiments, wherein the signal generated is configured to send the signal to the tool to disable movement of the moving blade if the sensor has detected one or more metal fibers has been cut.

The protective garment of any one or more of the embodiments, wherein the signal generator includes a wireless communication module.

The protective garment of any one or more of the embodiments, wherein the signal generator includes a wired coupling to the tool.

The protective garment of any one or more of the embodiments, wherein the garment is in the form of chaps configured to cover one or both of a user's legs.

A protective garment for protection from a tool having a moving blade includes a protective garment fabric. The fabric is formed from at least ten layers. At least one layer of the plurality of layers is formed from a plurality of fibers adapted to entangle with the moving blade upon contact between the moving blade and the fabric.

The protective garment of any one or more of the embodiments, wherein at least one layer of the plurality of layers includes diamond dust incorporated into the layer, wherein the diamond dust is configured to dull the moving blade upon contact between the moving blade and the fabric.

A protective garment and tool system includes a protective garment and a tool having a moving blade. The protective garment includes a protective garment fabric. The fabric is formed from a plurality of layers. At least one layer of the fabric is formed from a plurality of fibers adapted to entangle with the moving blade upon contact between the moving blade and the fabric. At least one layer of the fabric comprises metal fibers. The garment includes a garment sensing device coupled to the garment and having a sensor configured to detect when one or more metal fibers are cut and a signal generator configured to send a signal to the tool to disable movement of the moving blade. The tool having a moving blade includes a signal receiver configured to receive the signal from the signal generator of the protective garment, and a controller configured to disable the moving blade when the signal is received.

The system of any one or more of the embodiments, wherein the signal generator and the signal receiver each include a wireless communication module.

The system of any one or more of the embodiments, wherein the signal generator includes a wired tether configured to be coupled to the tool.

The system of any one or more of the embodiments, wherein the moving blade of the tool is disabled when the wired tether is uncoupled from the tool.

The system of any one or more of the embodiments, further including at least one tilt sensor provided on the garment or the tool, wherein the tilt sensor is configured to sense the relative angle between the garment and the tool.

The system of any one or more of the embodiments, wherein the tilt sensor is configured to send a tilt signal to the controller when the relative angle between the garment and the tool is outside a predetermined range, and the controller is configured to disable movement of the blade when the tilt signal is received.

The system of any one or more of the embodiments, wherein the tilt sensor is configured to send a tilt signal to the controller when the relative angle between the garment and the tool is changing faster than a predetermined threshold, and the controller is configured to disable movement of the blade when the tilt signal is received.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A protective garment for protection from a moving blade of a tool, the garment comprising:

a protective garment fabric, wherein the fabric is formed from a plurality of layers, wherein one or more of the plurality of layers is formed from a plurality of high-strength fibers adapted to entangle with the moving blade upon contact between the moving blade and the fabric, the high-strength fibers not being formed from metal;

wherein at least one layer of the plurality of layers comprises metal fibers; and a garment sensing device comprising:
 a sensor configured to detect when one or more metal fibers are cut, and
 a signal generator configured to send a signal to the tool to disable movement of the moving blade.

2. The protective garment of claim 1, wherein the signal generator is configured to send the signal to the tool to disable movement of the moving blade if the sensor has detected one or more metal fibers has been cut.

3. The protective garment of claim 1, wherein the signal generator comprises a wireless communication module.

4. The protective garment of claim 1, wherein the signal generator comprises a wired coupling to the tool.

5. The protective garment of claim 1, wherein the garment comprises chaps configured to cover one or both of a user's legs.

6. The protective garment of claim 1, wherein at least one layer of the fabric includes diamond dust incorporated into the layer, wherein the diamond dust is configured to dull the moving blade upon contact between the moving blade and the fabric.

7. The protective garment of claim 1, wherein the high-strength fibers are formed from one or more of the group consisting of: para-aramid; ballistic nylon; high performance filament yarn made of polyethylene terephthalate, polypropylene, or polyethylene; polyamide heavy duty nylon; and polyester.

8. A protective garment and tool system comprising:
 a protective garment comprising a protective garment fabric, wherein the fabric is formed from a plurality of layers, wherein one or more of the plurality of layers is formed from a plurality of high-strength fibers adapted to entangle with the moving blade upon contact between the moving blade and the fabric, the high-strength fibers not being formed from metal;
 wherein at least one layer of the plurality of layers comprises metal fibers;
 a garment sensing device coupled to the garment comprising a sensor configured to detect when one or more metal fibers are cut, and a signal generator configured to send a signal to the tool to shut off the moving blade; and
 a tool comprising a blade and an actuator configured to drive movement of the blade, the tool further comprising a signal receiver configured to receive the signal from the signal generator of the protective garment and a controller configured to disable movement of the blade when the signal is received.

9. The system of claim 8, wherein the signal generator and the signal receiver each comprise a wireless communication module.

10. The system of claim 8, wherein the signal generator comprises a wired tether configured to be coupled to the tool.

11. The system of claim 10, wherein the moving blade of the tool is disabled when the wired tether is uncoupled from the tool.

12. The system of claim 8, further comprising at least one tilt sensor provided on the garment or the tool, wherein the tilt sensor is configured to sense a relative angle between the garment and the tool.

13. The system of claim 12, wherein the tilt sensor is configured to send a tilt signal to the controller when the relative angle between the garment and the tool is outside a predetermined range, and the controller is configured to disable movement of the blade when the tilt signal is received.

14. The system of claim 12, wherein the tilt sensor is configured to send a tilt signal to the controller when the relative angle between the garment and the tool is changing faster than a predetermined threshold, and the controller is configured to disable movement of the blade when the tilt signal is received.

* * * * *